(12) United States Patent
Acharya

(10) Patent No.: US 6,639,691 B2
(45) Date of Patent: Oct. 28, 2003

(54) BLOCK-MATCHING ALGORITHM FOR COLOR INTERPOLATION

(75) Inventor: Tinku Acharya, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/494,087

(22) Filed: Jan. 28, 2000

(65) Prior Publication Data

US 2003/0053684 A1 Mar. 20, 2003

Related U.S. Application Data

(62) Division of application No. 08/963,334, filed on Nov. 3, 1997, now Pat. No. 6,130,960.

(51) Int. Cl.⁷ .............................. G06F 15/00; H04N 1/46
(52) U.S. Cl. ........................................ 358/1.9; 358/525
(58) Field of Search .......................... 358/1.9, 1.8, 525, 358/518, 512, 520, 523, 535; 382/164, 165, 161; 348/273, 264

(56) References Cited

U.S. PATENT DOCUMENTS

| | | | | |
|---|---|---|---|---|
| 4,630,307 A | * | 12/1986 | Cok | 382/25 |
| 4,663,661 A | | 5/1987 | Weldy et al. | |
| 4,962,419 A | * | 10/1990 | Hibbard et al. | 358/37 |
| 5,008,739 A | * | 4/1991 | D'Luna et al. | 358/21 R |
| 5,049,791 A | * | 9/1991 | Kawakami | 315/368 R |
| 5,053,861 A | | 10/1991 | Tsai et al. | |
| 5,065,229 A | * | 11/1991 | Tsai et al. | 358/21 R |
| 5,251,019 A | | 10/1993 | Moorman et al. | |
| 5,382,976 A | * | 1/1995 | Hibbard | 348/273 |
| 5,398,066 A | * | 3/1995 | Martinez-Uriegas et al. | 348/393 |
| 5,418,565 A | * | 5/1995 | Smith | 348/273 |
| 5,506,619 A | | 4/1996 | Adams, Jr. et al. | |
| 5,519,514 A | * | 5/1996 | TeWinkle | 358/514 |
| 5,541,653 A | * | 7/1996 | Peters | 348/264 |
| 5,596,367 A | | 1/1997 | Hamilton, Jr. et al. | |
| 5,631,703 A | | 5/1997 | Hamilton, Jr. et al. | |
| 5,642,443 A | * | 6/1997 | Goodwin et al. | 382/289 |
| 5,652,621 A | | 7/1997 | Adams, Jr. et al. | |
| 5,805,217 A | * | 9/1998 | Lu et al. | 348/273 |
| 5,901,242 A | | 5/1999 | Crane et al. | |
| 5,905,553 A | * | 5/1999 | Matsukawa et al. | 349/110 |
| 6,091,862 A | * | 7/2000 | Okisu | 382/300 |
| 6,181,376 B1 | * | 1/2001 | Rashkovkiy et al. | 348/273 |

OTHER PUBLICATIONS

"Interactions Between Color Plane Interpolation and Other Image Processing Functions in Electronic Photography", James E. Adams, Jr., SPIE (The International Society for Optical Engineering), vol. 2416 (Electronic Imaging '95), pp. 144–155 (Jul. 1995).

* cited by examiner

Primary Examiner—Madeleine Nguyen
(74) Attorney, Agent, or Firm—Blakely, Sokoloff, Taylor & Zafman LLP

(57) ABSTRACT

What is disclosed is method that interpolates missing color components for an original pixel by utilizing color gravities for surrounding blocks of green pixels. A new pixel is output which has complete color information which is a function of the original pixel and interpolated color components. The interpolated pixel is a true representation of both luminance and chrominance information.

41 Claims, 3 Drawing Sheets

FIG. 2

BLOCK-MATCHING ALGORITHM FOR COLOR INTERPOLATION

This application is a divisional of Ser. No. 08/963,334 filed Nov. 3, 1997 now U.S. Pat. No. 6,130,960.

BACKGROUND OF THE INVENTION

In digital cameras and imaging devices using only a single electronic sensor, the image color is captured by sub-sampling typically in three (Red, Green, Blue) color planes. In such cases, the original "raw image" is captured with each "raw image pixel" composed of only one of three vital color/intensity components: either R, G, or B (Red, Green, or Blue). But for image rendering devices (such as a monitor or printer), full color resolution is desirable. Recovery of full color information from this sub-sampled color is popularly known as color interpolation.

The following description refers to raw image pixels as either "pixels" or "raw image pixels". Pixels that are formed by virtue of a completed color interpolation technique will be referred to as "full color pixels". In digital still and video cameras and certain other imaging devices, raw images are first represented as rectangular row and column of pixels with each pixel having the intensity value of a particular color only. In the case of RGB (Red, Green and Blue) sub-sampling imaging devices, images are obtained and stored in a "Bayer" pattern. The Bayer pattern, when three color planes are sub-sampled using a color filter array (CFA), is characterized by including on a first row of an image, alternating pixels of Red and Green, and then on a next row alternating pixels of Blue and Green. Thus, the Bayer pattern for the first four rows of pixels (with each pixel typically an 8-bit value) is as follows (with the rows thereafter repeating the same pattern):

$$G \ R \ G \ R \ G \ R \ ...$$
$$B \ G \ B \ G \ B \ G \ ...$$
$$G \ R \ G \ R \ G \ R \ ...$$
$$B \ G \ B \ G \ B \ G \ ...$$
$$\vdots$$

As a result, each pixel location contains a value for a single color only. Assuming, as is the case in some imaging devices, that each pixel of the Bayer pattern has 8 bits of resolution (i.e., the pixel is a value representing the intensity of the color ranging from 0–255), then a "full color" pixel, one having R, G and B components would be a 24-bit value. To recover the two missing color components for each pixel, a color interpolation or color recovery is employed.

In color interpolation, an attempt is made to combine in some fashion neighboring pixel(s) to reconstruct, recover, or predict missing color component information for a given raw image pixel. Several prior art interpolation methods are described in *"Interactions Between Color Plane Interpolation and Other Image Processing Functions in Electronic Photography"*, James E. Adams, Jr., SPIE, (The International Society for Optical Engineering), Vol. 2416 (Electronic Imaging '95), pages 144–155 (July 1995), with most of these employing pixel averaging techniques to recover missing color components. At its simplest, a prior art averaging technique would interpolate the Red component of the captured Green pixel at row 2, column 2, (referring to the 8-bit Bayer pattern above) as the average of the two nearest red pixels, i.e., Red pixel at row 1, column 2 and the Red pixel at row 3, column 2. Likewise, the Blue component of the same captured Green at row 2, column 2 would be interpolated under an averaging technique as the average of the two nearest Blue pixels, i.e., the pixel at row 2, column 1 and the Blue pixel at row 2, column 3. The Blue and Red interpolated components are then combined with the original captured Green value of the pixel, row 2, column 2 to form a new pixel which is composite "full" color pixel. The resultant "RGB" full color pixel is an approximation or prediction of the original object's true color at that relative pixel location.

This averaging technique is crude in that the most visually critical information, such as edges, are decimated. If the pixel whose missing components are being interpolated lies on a edge boundary, then the averaging of pixels of corresponding color on each side of the boundary may cause that component to be a highly inaccurate version of the actual uncaptured color component. The edge, for that component would thus disappear. The response of the human visual system (eye, brain, etc.) to edge information is very acute, and thus, the blurriness of edge(s) will greatly detract from the perceived overall quality (sharpness, resolution, etc.) of an image. Further, other averaging techniques that attempt to detect patterns or edges are complex to implement in high-speed rendering applications. In these techniques, different formulas for averaging known as predictors are employed even within the same image depending on detected local patterns within the image. These techniques are not very efficient and further, if color components are interpolated when the pixels are being output, these techniques slow down the process of displaying or rendering pixels of an image into a display device. Averaging techniques produces images that are "soft" and not very crisp when viewed. Further "luminance" information contained in the Green pixels (which comprise 50% of the image according to the Bayer pattern) are a less significant factor than they should be when interpolation is carried out in the prior art techniques. The luminance information is greatest in Green pixels since Green is already a combination of two primary colors, Yellow and Blue. Thus, in terms of visual perception, Green contains more information about the original color of an area of pixels or pixel in the image than do Blue or Red pixels.

Thus, there is a need for an efficient color interpolation technique that more accurately reconstructs the original object color by taking into better account luminance information contained in Green pixels.

SUMMARY OF THE INVENTION

An interpolation method is disclosed for a raw image composed of pixels that utilizes color gravities of surrounding blocks of Green pixels in order to select neighboring pixels to attain missing color components for a raw image pixel. A new pixel is formed that has full color information which is a function of the raw image pixel and the interpolated color components.

BRIEF DESCRIPTION OF THE DRAWINGS

The objects, features and advantages of the method and apparatus for the present invention will be apparent from the following description in which:

FIG. 2 is an exemplary pixel map illustrated to explain color interpolation according to one embodiment of the invention.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
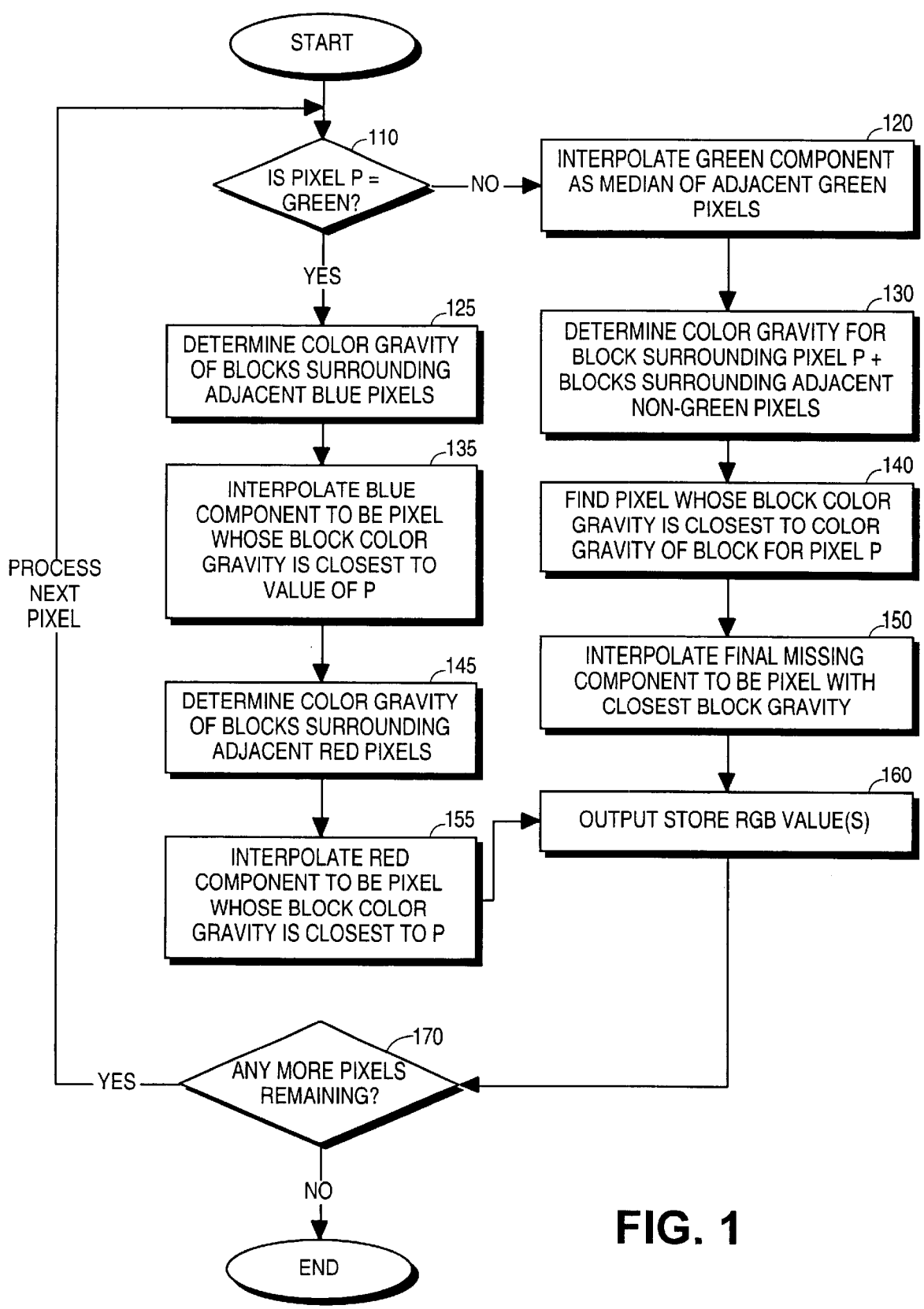
FIG. 1 is a flow diagram of color interpolation methodology according to one embodiment of the invention.

FIG. 1 is a flow diagram of color interpolation methodology according to one embodiment of the invention. The improved method of color interpolation disclosed herein is advantageous in better overcoming the blurriness effect over averaging-type interpolation techniques and also, in relating each raw image pixel's missing components to more relevant color information. Thus, various embodiments of the invention define a new parameter referred to as "color gravity", and based on the color gravity, the technique selects one neighboring pixel (with the same color as the sought-after missing color component of the raw image pixel under consideration) over another same color neighboring pixel to be interpolated as the missing color component. The utilization of the color gravity parameter allows the intelligent selection of an entire neighboring pixel value to compose the missing color component. In the averaging-type techniques of interpolation, an averaging of values that are highly uncorrelated from one another, the color information creates pixel artifacts by introducing colors not guaranteed present in the raw image. By contrast, various embodiments of the invention describe selecting one of the neighboring pixels as the missing value, based on image characteristics such as color gravity (defined below). This improves the overall visual quality of the image, better preserves edges and more accurately represents colors present the original object which was captured by the imaging device. Artifacts are diminished since the interpolated component is actually present in the original captured image.

The techniques discussed below and in the various embodiments of the invention determine the color gravity for each block of pixels surrounding the pixel under consideration for selection. Essentially, the pixel surrounding the block of pixels with the "closest" color gravity to the color gravity of the block of pixels surrounding the raw image pixel for which the missing component is being interpolated is selected to be that missing component.

In one embodiment of the invention, a vector of four pixels $\{X_1, X_2, X_3, X_4\}$, particularly wherein each $X_1, X_2, X_3, X_4$ is a Green pixel, constitutes a "block" for whom color gravity is determined. The pixel block $\{X_1, X_2, X_3, X_4\}$ surrounds adjacently the raw image pixel for which color gravity is being determined. The color gravity, according to one embodiment of the invention is defined as the simple arithmetic mean of the pixel values in the block. The color gravity for a block of pixels is represented hereinafter as X; and defined as $$X = \sum_{i=1}^{n} X_i/n$$

where the pixels $X_1, X_2, \ldots, X_n$ comprise the block. If each color block is chosen to contain only Green raw image pixels, then regardless of the color (R, G, or B) of the component being interpolated, only Green raw image pixel values are considered in calculating the color gravity. This more significantly utilizes luminance information in making the selection of which raw image pixel is to be used as the missing color component. To summarize, the color gravity block of Green pixels, of which there are always four adjacent neighbors for any (R, G, or B) pixel [except at image boundaries] in the Bayer pattern, is compared against color gravities for other blocks of Green pixels. Based on this comparison, a surrounding raw image pixel is selected as interpolating the missing color component. When all the missing color components are interpolated for each raw image pixel, new full color pixels are formed that have full RGB color component information by virtue of combining the raw image pixel with interpolated color components.

One embodiment of the invention is illustrated in FIG. 1. In this embodiment, a Green pixel is treated slightly differently than Red and Blue pixels when interpolating its missing color components. The color gravity of a Green pixel still refers to an adjacent block of Green pixels, but rather being an arithmetic mean, as defined above in general, the color gravity of a block of pixels surrounding a Green pixel G is G=median $\{G_1, G_2, G_3, G_4\}$ when $G_1, G_2, G_3, G_4$ are adjacent Green pixels. For this reason, the methodology first checks if the pixel for whom missing color components are being interpolated is Green or not Green (step 110). If the pixel is Green, both Red and Blue color component information need to be recovered based on the color gravity of the surrounding blocks.

If the pixel is not Green, then a Green color component as well as one of either Red or Blue components is missing in the pixel. The missing Green color component will be interpolated as the median of adjacent Green pixels (step 120). Given a Bayer pattern, this implies that the Green component will be interpolated to be the median of north, south, east and west adjacent pixel values which must be Green (see FIG. 2 mapping) whether the pixel P for which color components are being interpolated is a Blue or Red pixel. The determination of a median is well-known in the art, and refers to a value M, such that one-half of values in the set fall below M, and the other half of values in the set fall above M. Thus, the median computation requires an ordering of the block of pixel values from lowest to highest. The raw image pixel P for which missing color components are being interpolated, has only one final missing component, since Green is interpolated at step 120 and since the raw image pixel P already contains one of either Red or Blue color information.

To interpolate the missing Red component (if pixel P is Blue) or missing Blue component (if pixel P is Red), the first step is to determine the appropriate color gravity values. Thus, according to step 130, the color gravity for the Green block surrounding pixel P and the color gravity for the Green blocks surrounding each adjacent non-Green pixel is determined. In a Bayer pattern, a non-Green pixel P will have 4 diagonally adjacent pixels of the same color as the missing component color. Thus, if pixel P is Red (missing a Blue component), the northwest, southwest, northeast and southeast adjacent pixels will by default be Blue pixels (see FIG.

2). The color gravity for a block of Green pixels, in this embodiment of the invention, is determined for each of those adjacent non-Green pixels (step 130). Once all color gravities have been determined, the next step is to find the pixel whose surrounding block's color gravity is the "closest" to the color gravity of the block surrounding pixel P (step 140). The term "closest" as used herein when describing the various embodiments of the invention refers to one value that has the minimum absolute value distance (difference) to another value. Thus, each color gravity for blocks surrounding the adjacent non-Green pixels is subtracted from the color gravity of the block surrounding pixel P. The minimum of these differentials, in an absolute value sense, is the "closest" color gravity to that of the block surrounding pixel P. The final missing component is interpolated to be the adjacent pixel whose surrounding block color gravity is closest to the color gravity of the block surrounding pixel P (step 150). Finally, with each R, G, and B accounted for, the full color RGB pixel value(s) is/are stored to a storage medium or output to be rendered onto a display device (step 160).

Referring again to step 110, if the pixel P is Green, then a different methodology is used to interpolate the missing Red and Blue components. Since both Red and Blue components are missing, they may be interpolated in any order, but the methodology shown in FIG. 1 elects to interpolate the Blue component first. According to step 125, first, the color gravity of blocks surrounding adjacent Blue pixels is determined. In a Bayer pattern (see FIG. 2), a pixel P that is Green will ordinarily have north and south neighboring adjacent pixels of Blue color. Thus, two color gravity values, one for the Green block surrounding the north adjacent Blue pixel and one for the block surrounding the south adjacent Blue pixel, are determined. Next, the Blue component is interpolated to be the value of the adjacent Blue pixel with the color gravity closest to the value of pixel P (step 135). This is in contrast to the methodology employed when pixel P is not Green in that the color gravity of the non-Green pixel P is used rather than the value of raw image pixel P itself when being compared to neighboring pixel color gravities. When pixel P is Green, the pixel itself is the best representation of luminance of the pixel for which missing components can be selected and thus, is used to compare against neighboring block color gravities.

Next, the color gravity of blocks surrounding adjacent Red pixels is determined (step 145). As described above with respect to adjacent Blue pixels, in a Bayer pattern such as that illustrated in FIG. 2 there are two such adjacent Red pixels for whom Green block color gravities are determined. Next, according to step 155, the distance in an absolute value sense, between each color gravity for blocks surrounding the Red pixels and the pixel P is determined. The Red component of pixel P is interpolated to be the value of the pixel whose surrounding block color gravity is closest in distance to the value of pixel P (step 155). Once all R, G, B values are accounted for in a given pixel P, then the full R, G, B values for each pixel are stored or output (step 160). This interpolation technique forms a "full" color RGB pixel, and assumes the same resolution (such as 8 bits) for each raw image pixel and each of the interpolated components.

Processing of steps 110–160 will repeat for every pixel until all pixels in the raw image have been assigned full R, G, B color information to form full color pixels. In the case of an 8-bit Bayer pattern CFA, the newly formed full color pixels may have a total resolution of 24 bits (8 bits for each of the color components). According to step 170, the methodology checks to see if any more raw image pixels are remaining that have missing color components to be interpolated. If there are no more raw image pixels that have missing color components (checked at step 170), then the interpolation process will have been completed for a given image.

The newly formed full color (RGB) pixels may be stored in an array or output (step 160) one by one to be rendered onto a display device. The full color pixels may be output for rendering on-the-fly as soon as each pixel is interpolated rather than waiting for all pixels to attain full color. Until the interpolation process is complete for all pixels, the original 8-bit Bayer pattern, at least in the relevant part, should be maintained and not overwritten in the medium where stored since the interpolation procedure may use a raw image pixel more than once before all pixels attain full value.

Interpolation that utilizes the color median of Green pixel blocks, as in this and other embodiments of the invention, better represents luminance in recovering missing color components. The resulting R, G, and B components when combined to form each full color pixel will visually more closely resemble the original color of the object prior to its image capture into the Bayer pattern CFA.

The process of interpolation may be performed when the image is about to be displayed onto a monitor or output to a peripheral device such as a printer. The methodology shown in FIG. 1 may be implemented in computer software such that an 8-bit Bayer pattern CFA image, when its pattern values are read out, can also be interpolated upon in a pixel-by-pixel fashion. Often, the 8-bit Bayer pattern CFA data will have been stored in a compressed format, such that the data must first be decompressed to recover the Bayer pattern values. After interpolation, the 24 bit-per-pixel resulting RGB color resolution is convenient for most display environments currently commercially available. However, the methodology of FIG. 1 can be adopted to any raw image even if it exists in a pattern other than the Bayer pattern or can be extended to attain any desired pixel color resolution and is not limited to an 8-bit to 24-bit conversion. Further, though only immediately adjacent pixels have been used to intelligently select the interpolated value of a missing color component, one skilled in the art will readily be able to modify the methodology of FIG. 1 to expand the selection set to pixels not immediately adjacent but two or more pixel locations away in distance from the pixel location whose missing color components are being interpolated.

Figure 2:
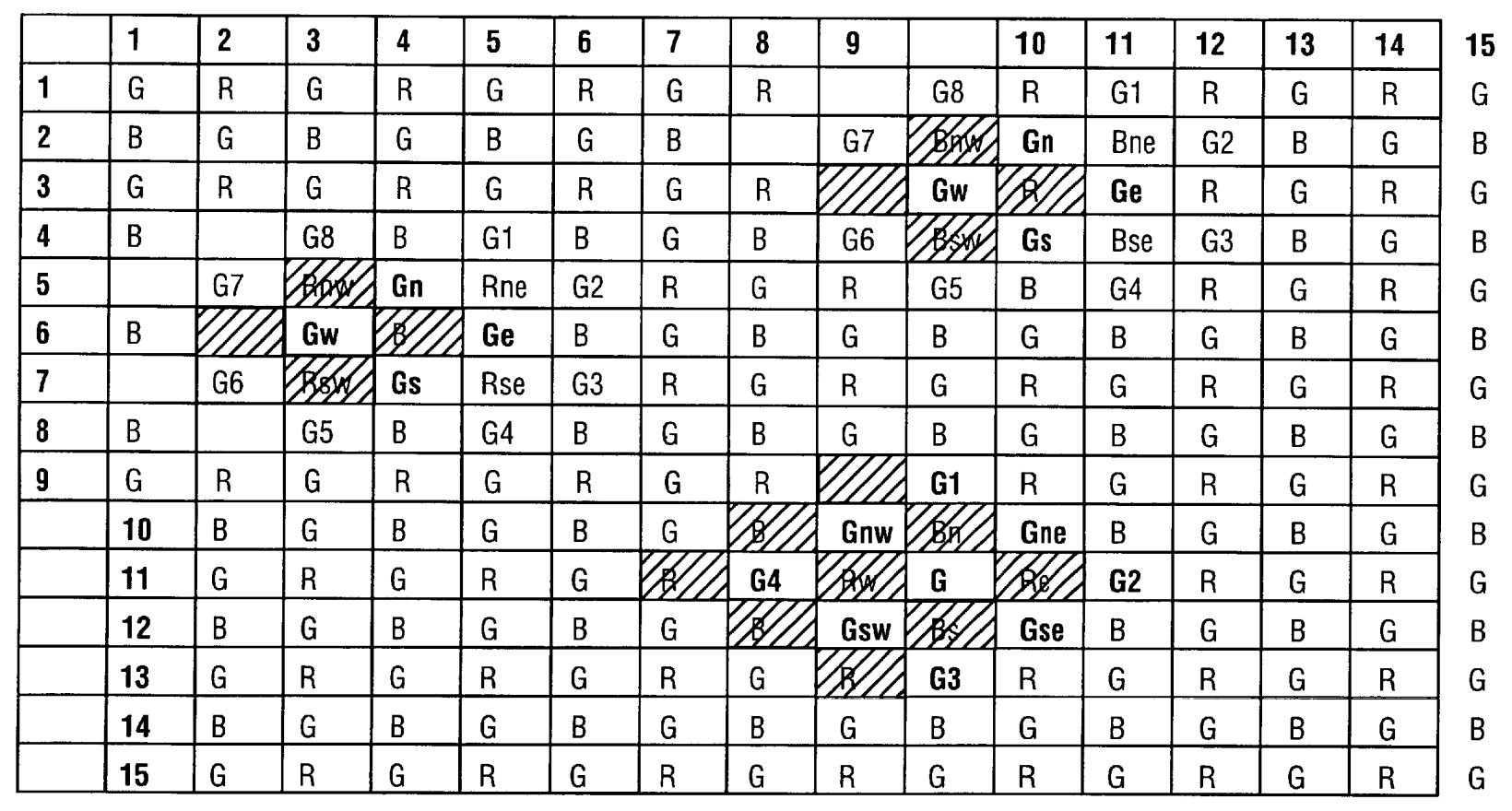

FIG. 2 is an exemplary pixel map illustrated to explain color interpolation according to one embodiment of the invention. FIG. 2 shows a 15×15 Bayer pattern of a typical image with 8-bit color information in each pixel location generated in a Color Filter Array (CFA) from an image sensor. The methodology described above will be illustratively explained with regard to the raw image pixels as patterned in FIG. 2. The terminology X(m,n) will indicate a pixel X at row location m and column location n. Each pixel X will be represented by either an R, G, or B indicating its raw image color information as attained in the CFA. Neighboring pixels will be designated by the pixel color and a subscript indicating direction from the pixel X. Where no directional indicator is appropriate pixels will be represented by color and a sequential numerical identifier, e.g., G1, G2, etc.

For example, consider the Blue pixel in location (6,3) i.e., in row 6 and column 3. The 8-bit pixel B(6,3) consists of Blue color information only. It is thus desirable to recover the Green and Red color component information for B(6,3) such that the pixel location (6,3) can become a full color (RGB) pixel. The pixel B(6,3) has four neighboring green pixels Gn (the north neighbor), Gs (south), Ge (east), Gw (west) and four neighboring red pixels Rne (the northeast neighbor), Rse (southeast), Rsw (southwest) and Rnw (northwest), as shown in FIG. 2. The neighboring Green pixels form the green color block represented by the vector G={Gn, Ge, Gs, Gw} whose color gravity is G. G represents the color gravity of the block surrounding pixel B(6,3). The missing Red component R for pixel location (6,3) will be interpolated by selecting one value from the set of surrounding whole pixel values Rne, Rse, Rsw and Rnw. The selection is based on the values of color gravities of the four neighboring green color blocks Gne={G1, G2, Ge, Gn}, Gse={Ge, G3, G4, Gs}, Gsw={Gw, Gs, G5, G6} and Gnw={G8, Gn, Gw, G7} centering around pixels Rne, Rse, Rsw, Rnw, respectively. The technique selects the pixel whose block color gravity is closest to G. The Red color raw image pixel contained at the center of the green color block with closest color gravity to G will be interpolated as the Red component for the pixel location (6,3). The missing Green color component will be interpolated as the median of the neighboring four green pixels {Gn, Ge, Gs, Gw} surrounding pixel location (6,3). Thus, when the missing color components are determined, the pixel location (6,3) will now have Green and Red color component information which can be combined with the Blue value of the raw image pixel at (6,3) to form a full color (RGB) pixel. If each color component is 8 bits, the full color pixel that is formed will be of 24-bit resolution.

Likewise, the same procedure can be used to recover the missing Blue color component for a pixel location containing originally Red color information only. For example, the pixel (R) at location (3,10) contains Red information only and thus needs Green and Blue components to be interpolated. The Blue color component of R(3,10) is chosen from one of the Bne, Bse, Bsw and Bnw neighboring values, depending upon the values of the color gravities which are:

$$\underline{Gne} = \frac{(G1, G2, G3, Gn)}{4}, \underline{Gse} = \frac{(Ge, G3, G4, G2)}{4},$$

$$\underline{Gsw} = \frac{(Gw, Gs, G5, G6)}{4} \text{ and } \underline{Gnw} = \frac{(G8, Gn, Gw, G7)}{4},$$

centering around the Blue pixels Bne, Bse, Bsw, and Bnw, respectively.

Recovery/interpolation of missing Blue and Red color components for a raw image pixel containing Green (G) is slightly different from that of a non-Green raw image pixel. The raw image pixel (G) at location (11,9) contains Green originally and thus it would be desirable to interpolate missing Blue and Red components from surrounding whole pixels. In interpolating the Blue color component, the color gravities Gn (for pixel Bn) and Gs (for pixel Bs) are $$\underline{Gn} = \frac{(G1, Gne, G(11, 9), Gnw)}{4} \text{ and } \underline{Gs} = \frac{(G(11, 9), Gse, G3, Gsw)}{4},$$

respectively, are determined. If the absolute value difference between Gn and G(11,9) is smaller than the difference between and G(11,9), Bn is selected to be the Blue color component at location (11,9), otherwise Bs is selected to be the Blue color component at that location.

To recover the missing Red color component, the technique determines the color gravities Gw (for pixel Rw) and Ge (for pixel Re) which are $$\underline{Gw} = \frac{(Gnw, G(11, 9), Gsw, G4)}{4} \text{ and } \underline{Ge} = \frac{(Gne, G2, Gse, G)}{4},$$

respectively. If the difference between Gw and G(11,9) is smaller than the difference between Ge and G(11,9), Rw is selected to be the red color component for location (11,9), otherwise Re is selected to be the Red color component at that location.

In a pseudo-code, the entire methodology can be described as follows:

```
begin
    if the pixel location P is not Green then
    {
        P(Green) =median{Gn, Ge, Gs, Gw};
        determine Δ1=P-Gne, Δ2=P-Gse, Δ3=P-Gsw, Δ4=P-Gnw;
```

$$\text{where } P = \frac{Gn + Ge + Gs + Gw}{4}$$

```
        Find Δ_min = min{|Δ1|, |Δ2|, |Δ3|, |Δ4|};
        If (Δ_min = |Δ1|) then    P(Red)=Rne if Red is missing, else
                                    P(Blue)=Bne if Blue is missing;
        If (Δ_min = |Δ2|) then    P(Red)=Rse if Red is missing,
                                    P(Blue)=Bse if Blue is missing;
        If (Δ_min = |Δ3|) then    P(Red)=Rsw if Red is missing,
                                    P(Blue)=Bsw if Blue is missing;
        If (Δ_min = |Δ4|) then    P(Red)=Rnw if Red is missing,
                                    P(Blue)=Bnw if Blue is missing;
    };
    if the pixel location P is Green (G) then
        determine Δn=G-Gn, Δs=G-Gs, Δw=G-Gw, Δe=G-Ge
        If (|Δn|<|Δs|) then P(Blue)=Bn else P(Blue)=Bs;
        If (|Δw|<|Δe|) then P(Red)=Rn else P(Red)=Rs;
    }
end
```

In the above pseudo code, x in P(x) represents the sought after missing color component. Though not explicitly stated, the sub-sampled raw image value remains in the new full color pixel since it is the most exact representation of that color that the sensor can provide. When the above pseudo code is to be implemented as computer program product, several simplifications can be employed. Referring still to FIG. 2, when determining Δ1, for example, Δ1 can be expanded as:

$$\Delta 1 = \underline{P} - \underline{Gne}$$

$$\Delta 1 = \frac{(Gn + Gs + Gw + Ge)}{4} - \frac{(Gn + Ge + G1 + G2)}{4}$$

$$\Delta 1 = \frac{Gn}{4} + \frac{Gs}{4} + \frac{Gw}{4} + \frac{Ge}{4} - \frac{Gn}{4} - \frac{Ge}{4} - \frac{G1}{4} - \frac{G2}{4}$$

$$\Delta 1 = \frac{Gs}{4} + \frac{Gw}{4} - \frac{G1}{4} - \frac{G2}{4}$$

$$\Delta 1 = \frac{(Gs + Gw - G1 - G2)}{4}$$

Likewise, similar simplifications can be employed for each of the other Δ or differential values in the pseudo code above such that $$\Delta 2 = \frac{(Gn + Gw - G3 - G4)}{4}$$

$$\Delta 3 = \frac{(Gn + Ge - G5 - G6)}{4}$$

$$\Delta 4 = \frac{(Gs + Ge - G7 - G8)}{4}$$

$$\Delta n = P - \frac{(G1 + Gne + Gnw)}{4}$$

$$\Delta s = \frac{3*P}{4} - \frac{(G3 + Gse + Gsw)}{4}$$

$$\Delta w = \frac{3*P}{4} - \frac{(G4 + Gnw + Gsw)}{4} \text{ and}$$

$$\Delta e = \frac{3*P}{4} - \frac{(G2 + Gne + Gse)}{4}$$

The above simplifications will allow optionally efficient programming code to be written to carry out color interpolation. Since the above formulation of color gravity divides by 4 uniformly, the factor 4 can be removed thus leaving only addition and subtraction operations when determining color gravity closeness. The removal of the factor (¼) from the above formulas will alleviate error due to floating point division that may be introduced by the computer environment employed to carry out the above techniques.

Image Boundaries

Referring again to the CFA of FIG. 2, pixel locations at the boundaries of the image, such as those in rows 1 and 15 and columns 1 and 15 do not have a complete set of neighboring adjacent Green pixels as do the pixels at interior locations of the array such as location (6,3). The color interpolation methodology can include simplified color gravity techniques for certain image boundary pixels. Thus, at a corner pixel location (1,1), the Red component can be interpolated as the only adjacent Red pixel which is at location (1,2). Likewise, the Blue component from the corner pixel (1,1) can be interpolated as the only adjacent Blue pixel which is at (2,1).

For other edge pixels such as the Red pixel at location (1,2), the Green component is the median of the three adjacent Green pixels rather than a block of 4 pixels as with interior pixel locations. Determining the median of three pixel values involves less computation than does calculating the median of four pixel values. The median of pixels $\{X_1, X_2, X_3\}$ is simply $X_2$, provided that the set $\{X_1, X_2, X_3\}$ is ordered from lowest to highest, respectively.

The missing Blue component of the Red pixel at location (1,2) must be selected between the Blue pixel at (2,1) and B(2,3), the Blue pixel at location (2,3). There is a block of three surrounding Green pixels used to determine color gravity for pixel B(2,1) and a block of four Green pixels for the block surrounding pixel (2,3). The color gravity for the pixel B(2,1) will thus be the average of three pixels rather than 4. The methodology described in FIG. 1 should take account of any such anomalies that occur in raw image pixels at the periphery of the CFA. Other such boundary simplifications can be employed by one of ordinary skill in the art as is required/desired by the arrangement of periphery pixels.

Figure 3:
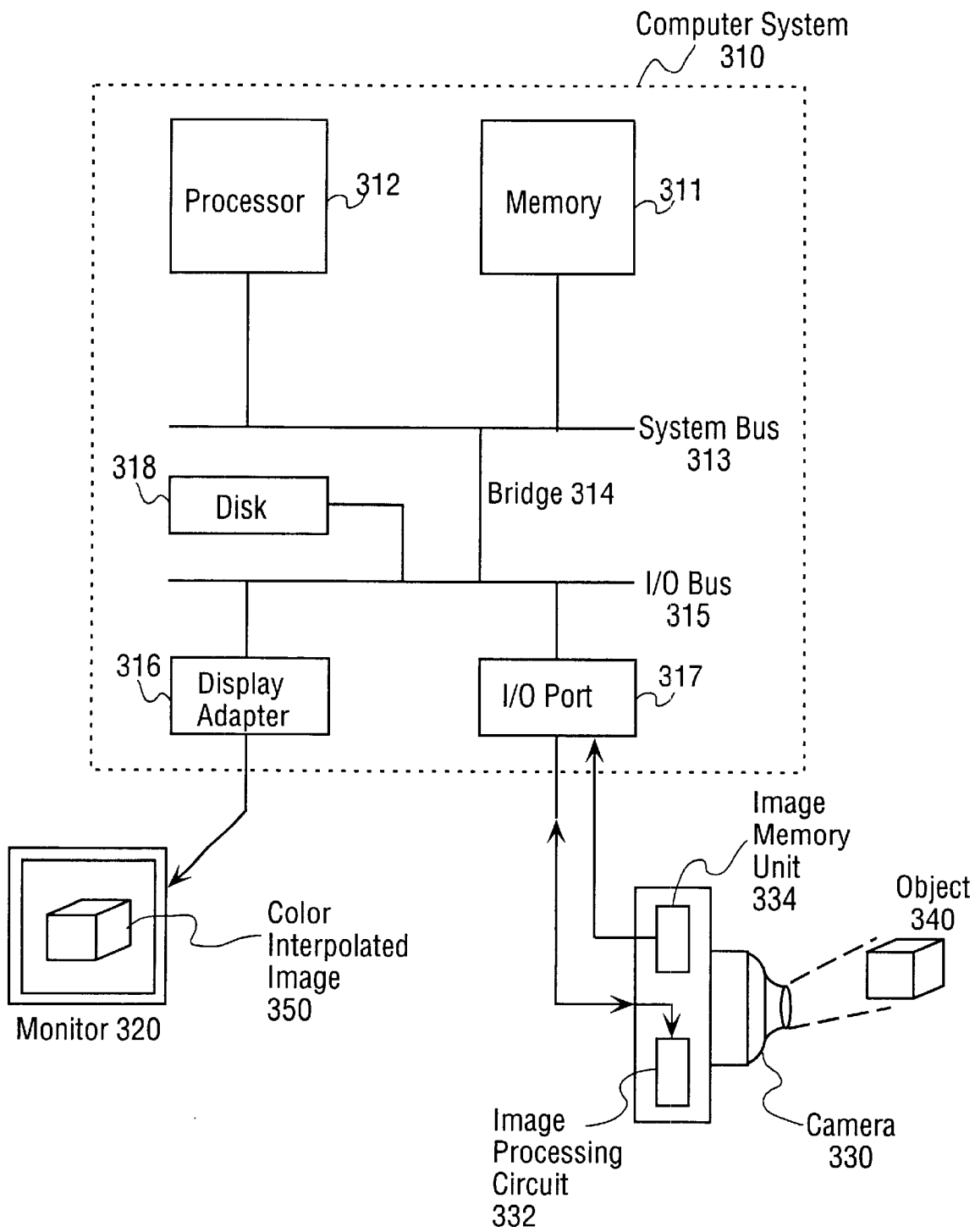
FIG. 3 is a system diagram of one embodiment of the invention.

FIG. 3 is a system diagram of one embodiment of the invention. FIG. 3 illustrates a computer system 310, which may be any general or special purpose determining or data processing machine such as a PC (personal computer), coupled to a camera 330. Camera 330 may be a digital camera, digital video camera, or any image capture device or imaging system, and is utilized to capture a sensor image of an object 340. Essentially, captured images are compressed and processed by an image processing circuit 332 so that they can be efficiently stored in an image memory unit 334, which may be a RAM or other storage device such as a fixed disk, miniature card, etc. In most digital cameras, raw images obtained from the image capture mechanism such as a sensor are stored first on camera 330 and downloaded later to be output, displayed, or manipulated. This allows the camera 330 to capture the next object quickly without additional delay. One convenient raw image representation is the 8-bit Bayer pattern CFA shown in FIG. 2.

In one embodiment, an image is captured by camera 330 as a raw 8-bit sub-sampled Bayer pattern CFA. Color interpolation in this embodiment of the invention operates as follows. First, the sub-sampled image is downloaded from camera 330 through I/O port 317 to a disk 318 or other device on the computer system 310. The computer system performs color interpolation by executing instructions for doing so according to various embodiments of the invention.

The methodology described in the various embodiments of the invention may be executed using a processor 312 such as the Pentium™ (a product of Intel Corporation) and a memory 311, such as RAM, which is used to store/load instruction, addresses and result data. The application used to interpolate the color information of the image may be an executable module compiled from source written in a language such as C++. The instructions of that executable module, which correspond with instructions that aid in interpolating missing color component information may be stored to a disk 318 or memory 311. It would be readily apparent to one of ordinary skill in the art of computer sciences to program a determining machine to carry out the interpolation methodology described in various embodiments of the invention.

Computer system 310 has a system bus 313 which facilitates information transfer to/from the processor 312 and memory 311 and also has a bridge 314 which couples system bus 313 to an I/O bus 315. I/O bus 315 connects various I/O devices such as a display adapter 316, disk 318 and an I/O port, such as a serial port. Many such combinations of I/O devices, buses and bridges can be utilized with the invention and the combination shown is merely illustrative of one such possible combination.

When an image, such as an image of object 340, is captured, the image is sensed as R, G, and B pixels, in a CFA such as the Bayer pattern of FIG. 2. These pixel values are sent to the image processing circuit 332. Image processing circuit 332 consists of ICs and other components which execute different image processing functions. The need for color interpolation is most significant when the image is to be displayed or output and thus does not have to be performed on camera 330. When the user or application desires/requests a download of images, the sub-sampled color images stored in the image memory unit are transferred from image memory unit 334 to the I/O Port 317. I/O port 317 uses the bus-bridge hierarchy shown (I/O bus 315 to bridge 314 to system bus 313) to temporarily store the image data into memory 311 or, optionally, to disk 318.

The downloaded image will thus have pixels with missing color component information. If a full color image (each pixel having Red, Green and Blue) is desired to be output on monitor 320, then color interpolation should be employed. The downloaded sub-sampled image is analyzed pixel-by-pixel and by applying the techniques discussed above, each raw image pixel is transformed into a full color pixel. Color interpolated image 350 will appear to have a full 24-bit color resolution given adequate display devices (monitor 320 and adapter 316) will resemble the color quality of the original object 340. The interpolated missing color component values and the raw image pixel values obtained from the Bayer pattern CFA may be stored onto disk 318, memory 311 or output directly to monitor 320 after being rendered through display adapter 316.

The computer program code for color interpolation may be packaged onto a removable medium such as floppy disk or CD-ROM and may accompany software that performs the decompression of images downloaded from camera 330. As with any other software, it can be downloaded/distributed over a network on communications system, or can be available in firmware. These downloaded images can be color interpolated and stored into a useful full RGB format so that the images will more accurately visually present the object 340 to the user. Color interpolation can also be implemented in hardware where no computer system capable of executing software code is available.

In an alternative embodiment of the invention, the image processing circuit 332 can be adapted to include circuitry for performing color interpolation on-camera, such that the stored image in image memory unit 334 is a full color image. In such an embodiment, the image may be downloaded to a printer or other display device directly from camera 330 without need of an intervening data processing system like computer system 310. The downloaded image from camera 330 will already have full color since color interpolation, in this alternative embodiment of the invention, is performed on-camera during image processing.

What is claimed is:

1. A method for color interpolation of a raw image composed of pixels, comprising:

interpolating a missing color component for each raw image pixel by selecting from neighboring pixels based on color gravities for blocks of Green pixels surrounding the neighboring pixels; and forming a new full color pixel having full color information, the full color information being a function of the raw image pixel and of the interpolated missing color component, wherein the interpolating comprises:
        determining if the raw image pixel is Green;
        if the raw image pixel is Green, applying a first interpolation methodology for interpolating missing Red and Blue components; and
        if the raw image pixel is not Green, applying a second interpolation methodology for interpolating a missing Green color component and one of missing Blue and Red color component.

2. An imaging apparatus comprising:

an image processing circuit to receive raw image data, said image processing unit configured to interpolate color components missing in said raw image data by selecting neighboring pixels based on color gravities of blocks of Green pixels surrounding said neighboring pixels.

3. An apparatus according to claim 2 further comprising an image sensing device coupled to said image processing circuit, said image sensing device configured to provide said raw image data, said raw image data representing at least one physical object.

4. An apparatus according to claim 3 wherein said raw image data is stored in a Bayer pattern color filter array.

5. An apparatus according to claim 2 further comprising:

an image memory unit coupled to said image processing circuit to receive and store said raw image data along with interpolated color components for each pixel.

6. A method of color interpolation for a raw image composed of pixels, comprising:

interpolating a missing color component for a raw image pixel by selecting from neighboring pixels based on color gravities for blocks of pixels of a first color surrounding the neighboring pixels, a selected pixel being set as an interpolated missing color component in the case of missing color components other than of the first color; and forming a new pixel as having full color information, the full color information being a function of the raw pixel and of the interpolated missing color components, where the interpolation includes:
        determining if the raw image pixel is of the first color;
        if the raw image pixel is of the first color, applying a first interpolation methodology to interpolate missing components of second and third colors; and
        if the raw image pixel is not of the first color, applying a second interpolation methodology to interpolate a missing component of the first color and a missing component of one of the second color and the third color.

7. A method according to claim 6, wherein the first interpolation methodology includes:

determining the color gravity of blocks surrounding adjacent pixels of the second color; and determining the color gravity of blocks surrounding adjacent pixels of the third color.

8. A method according to claim 7, wherein the blocks are blocks of pixels of the first color.

9. A method according to claim 7, wherein the first interpolation methodology further includes:

determining which adjacent pixel of the second color has a surrounding block color gravity closest to the value of the raw image pixel; and determining which adjacent pixel of the third color has a surrounding block color gravity closest to the value of the raw image pixel.

10. A method according to claim 9, further comprising:

interpolating the missing third color component of the raw image pixel to be the pixel of the third color whose surrounding block color gravity is determined to be closest to the value of the raw image pixel; and interpolating the missing second color component of the raw image pixel to be the pixel of the second color whose surrounding block color gravity is determined to be closest to the value of the raw image pixel.

11. A method according to claim 7, wherein the color gravity of a block is defined as an average of the pixel values within that block.

12. A method according to claim 7, wherein the second interpolation methodology includes:

interpolating the missing first color component as the median of values of pixels of the first color that are adjacent to the raw image pixel.

13. A method according to claim 7, further comprising:

determining the color gravity for a block surrounding the raw image pixel; and determining the color gravity for a block surrounding each adjacent pixel surrounding the raw image pixel, wherein the adjacent pixel has a color other than the first color.

14. A method according to claim 13, further comprising:

determining which of the color gravities for adjacent pixels not of the first color is the closest to the color gravity for a block surrounding the raw image pixel; and interpolating the missing second and third color components as the value of the pixel not of the first color whose color gravity is determined closest to the color gravity of the block surrounding the raw image pixel.

15. A method according to claim 7, wherein raw image pixels located in image corners have second and third color components interpolated to be adjacent pixel values not of the first color.

16. A method according to claim 6, wherein the image is arranged in a Bayer pattern.

17. A method according to claim 6, wherein interpolating and forming are repeatedly performed for each pixel contained in the raw image.

18. A machine readable medium having instructions stored thereon that when executed by a processor cause a system to:

interpolate a missing color component for a raw image pixel by selecting from neighboring pixels based on color gravities for blocks of pixels of a first color surrounding the neighboring pixels, a selected pixel being set as an interpolated missing color component in the case of missing color components other than of the first color; and form a new pixel as having full color information, the full color information being a function of the raw pixel and of the interpolated missing color component, where the interpolation includes determining if the raw image pixel is of the first color, if the raw image pixel is of the first color, applying a first interpolation methodology to interpolate missing components of second and third colors, and if the raw image pixel is not of the first color, applying a second interpolation methodology to interpolate a missing component of the first color and a missing component of one of the second color and the third color.

19. The machine readable medium of claim 18, further comprising instructions that when executed cause the system to:

determine the color gravity of blocks surrounding adjacent pixels of the second color; and determine the color gravity of blocks surrounding adjacent pixels of the third color.

20. The machine readable medium of claim 19, wherein the blocks are blocks of pixels of the first color.

21. The machine readable medium of claim 19, further comprising instructions that when executed cause the system to:

determine which adjacent pixel of the second color has a surrounding block color gravity closest to the value of the raw image pixel; and determine which adjacent pixel of the third color has a surrounding block color gravity closest to the value of the raw image pixel.

22. The machine readable medium of claim 21, further comprising instructions that when executed cause the system to:

interpolate the missing third color component of the raw image pixel to be the pixel of the third color whose surrounding block color gravity is determined to be closest to the value of the raw image pixel; and interpolate the missing second color component of the raw image pixel to be the pixel of the second color whose surrounding block color gravity is determined to be closest to the value of the raw image pixel.

23. The machine readable medium of claim 19, wherein the color gravity of a block is defined as an average of the pixel values within that block.

24. The machine readable medium of claim 19, further comprising instructions that when executed cause the system to:

interpolate the missing first color color component as the median of values of pixels of the first color adjacent to the raw image pixel.

25. The machine readable medium of claim 19, further comprising instructions that when executed cause the system to:

determine the color gravity for a block surrounding the raw image pixel; and determine the color gravity for a block surrounding each adjacent pixel surrounding the raw image pixel, wherein the adjacent pixel has a color other than the first color.

26. The machine readable medium of claim 25, further comprising instructions that when executed cause the system to:

determine which of the color gravities for adjacent pixels not of the first color is the closest to the color gravity for a block surrounding the raw image pixel; and interpolate the missing second and third color components as the value of the pixel not of the first color whose color gravity is determined closest to the color gravity of the block surrounding the raw image pixel.

27. The machine readable medium of claim 19, wherein raw image pixels located in image corners have second and third color components interpolated to be adjacent pixel values not of the first color.

28. The machine readable medium of claim 18, wherein the image is arranged in a Bayer pattern.

29. The machine readable medium of claim 18, wherein the instruction sequences to interpolate and form are repeatedly performed for each pixel contained in the raw image.

30. A machine readable medium having instructions stored thereon that when executed by a processor cause a system to perform operations comprising:

interpolating a missing color component for each raw image pixel by selecting from neighboring pixels based on color gravities for blocks of Green pixels surrounding the neighboring pixels; and forming a new full color pixel having full color information, the full color information being a function of the raw image pixel and of the interpolated missing color component, wherein interpolating comprises:

determining if the raw image pixel is Green;

if the raw image pixel is Green, applying a first interpolation methodology for interpolating missing Red and Blue components; and if the raw image pixel is not Green, applying a second interpolation methodology for interpolating a missing Green component and one of missing Blue and Red component.

31. An apparatus comprising:

a camera having image processing circuitry to compress digital images captured by an image sensor in said camera, and an image memory unit to store the compressed images, the digital images being derived from raw images captured by the sensor and having full color information, the image processing circuit to perform color interpolation on a raw pixel by setting a missing component of said raw pixel to be a value of a selected neighbor raw pixel that has the same color as that of the missing component, based on a comparison involving color gravities of a first pixel block surrounding said selected neighbor raw pixel and of a second pixel block surrounding another same color neighbor raw pixel.

32. The apparatus of claim 31 wherein the image sensor is to capture the raw images according to a Bayer RGB pattern.

33. The apparatus of claim 31 wherein the color gravity of a pixel block includes the arithmetic mean of pixel values in said pixel block.

34. The apparatus of claim 31 wherein the first pixel block and the second pixel block are composed of raw pixels of the same color.

35. The apparatus of claim 34 wherein said same color is green.

36. The apparatus of claim 31 wherein the image processing circuitry is to perform said color interpolation based on the comparison which includes determining which of the first and second blocks has the closest color gravity to a value of said raw pixel, if said raw pixel is green.

37. The apparatus of claim 31 wherein the image processing circuitry is to perform said color interpolation based on the comparison which includes determining which of the first and second blocks has the closest color gravity to that of a pixel block surrounding said raw pixel, if said raw pixel is not green.

38. A method for color interpolation of a digital image having raw pixels, comprising:

setting a missing non-green component of a raw pixel to be a value of a selected neighbor raw pixel that has the same color as that of the missing component, based on a comparison involving color gravities of a first pixel block surrounding said selected neighbor raw pixel and of a second pixel block surrounding another same color neighbor raw pixel.

39. The method of claim 38 wherein the first and second blocks are composed of raw pixels of the same color.

40. The method of claim 39 wherein said same color is green.

41. The method of claim 38 wherein the color gravity of the first block includes an arithmetic mean of pixel values in said first block, if said selected neighbor raw pixel is non-green.

* * * * *